United States Patent
Buford

(10) Patent No.: US 9,365,212 B2
(45) Date of Patent: Jun. 14, 2016

(54) METHOD AND SYSTEM FOR CONTROLLING A HYBRID VEHICLE

(71) Applicant: GM GLOBAL TECHNOLOGY OPERATIONS LLC, Detroit, MI (US)

(72) Inventor: Keith D. Buford, Southfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/464,072

(22) Filed: Aug. 20, 2014

(65) Prior Publication Data

US 2016/0052512 A1 Feb. 25, 2016

(51) Int. Cl.
*B60W 20/00* (2006.01)
*G07C 5/08* (2006.01)
*G01C 21/34* (2006.01)

(52) U.S. Cl.
CPC ........... *B60W 20/50* (2013.01); *G01C 21/3407* (2013.01); *G01C 21/3469* (2013.01); *G07C 5/0816* (2013.01); *Y10S 903/903* (2013.01)

(58) Field of Classification Search
CPC .......................... B60W 20/50; G01C 21/3407
USPC .......................................................... 701/22
See application file for complete search history.

(56) References Cited

U.S. PATENT DOCUMENTS

| 8,249,770 | B2 * | 8/2012 | Bennewitz | B60K 6/365 340/426.24 |
|---|---|---|---|---|
| 2011/0029168 | A1 * | 2/2011 | Talberg | B60K 6/48 701/22 |
| 2013/0030630 | A1 * | 1/2013 | Luke | H02J 7/00 701/22 |
| 2015/0258986 | A1 * | 9/2015 | Hayakawa | B60W 10/06 701/22 |

* cited by examiner

*Primary Examiner* — Mussa A Shaawat
*Assistant Examiner* — Michael Berns
(74) *Attorney, Agent, or Firm* — Quinn Law Group, PLLC

(57) ABSTRACT

A method for controlling a hybrid vehicle having an internal combustion engine and an electric machine includes the following steps: (a) sending data indicative of a current location of the hybrid vehicle to a command center after the hybrid vehicle experiences the loss of propulsion; (b) sending data indicative of a desired destination to the command center; (c) receiving a remedial action command from the command center, wherein the remedial action command is based, at least in part, on vehicle operating parameters, the current location of the hybrid vehicle, and the desired destination; and (d) commanding the hybrid vehicle to perform a remedial action corresponding to the remedial action command, wherein the remedial action allows the hybrid vehicle to travel from the current location to a predetermined location after the hybrid vehicle has experienced the loss of propulsion.

13 Claims, 7 Drawing Sheets

METHOD AND SYSTEM FOR CONTROLLING A HYBRID VEHICLE

TECHNICAL FIELD

The present disclosure relates to a method and system for controlling a hybrid vehicle.

BACKGROUND

A hybrid vehicle includes a hybrid powertrain, which has an internal combustion engine, a fuel source fluidly coupled to the internal combustion engine, at least one electric machine, and an energy storage device electrically connected to the electric machine. Accordingly, the hybrid vehicle can be propelled by the internal combustion engine, the electric machine, or both.

SUMMARY

A hybrid vehicle may experience a loss of propulsion for a number of reasons. For instance, the hybrid vehicle may purposefully lose propulsion if the internal combustion engine is not operating as designed. In such case, it is useful to command the hybrid vehicle to perform a remedial action in order to allow the hybrid vehicle to be driven to a desired destination or to a location relatively close to the desired destination. To this end, the present disclosure describes a method for controlling a hybrid vehicle in order to allow the hybrid vehicle to reach a desired destination after a loss of propulsion.

The present disclosure relates to a method for controlling a hybrid vehicle. As discussed above, the hybrid vehicle has an internal combustion engine and an electric machine. In an embodiment, the method includes the following steps: (a) sending data indicative of a current location of the hybrid vehicle to a command center after the hybrid vehicle has experienced a loss of propulsion; (b) sending data indicative of a desired destination to the command center after the hybrid vehicle has experienced the loss of propulsion; (c) receiving a remedial action command from the command center, wherein the remedial action command is based, at least in part, on vehicle operating parameters, the current location of the hybrid vehicle, and the desired destination; and (d) commanding the hybrid vehicle to perform a remedial action corresponding to the remedial action command. The remedial action allows the hybrid vehicle to be driven from the current location to the predetermined location after the hybrid vehicle has experienced the loss of propulsion. The predetermined location may be a destination desired by the vehicle operator (i.e., the desired destination) or an alternative location. The present disclosure also relates to a hybrid vehicle including a control module programmed to execute the steps of the method described above.

The above features and advantages and other features and advantages of the present teachings are readily apparent from the following detailed description of the best modes for carrying out the teachings when taken in connection with the accompanying drawings.

DETAILED DESCRIPTION

Figure 1:
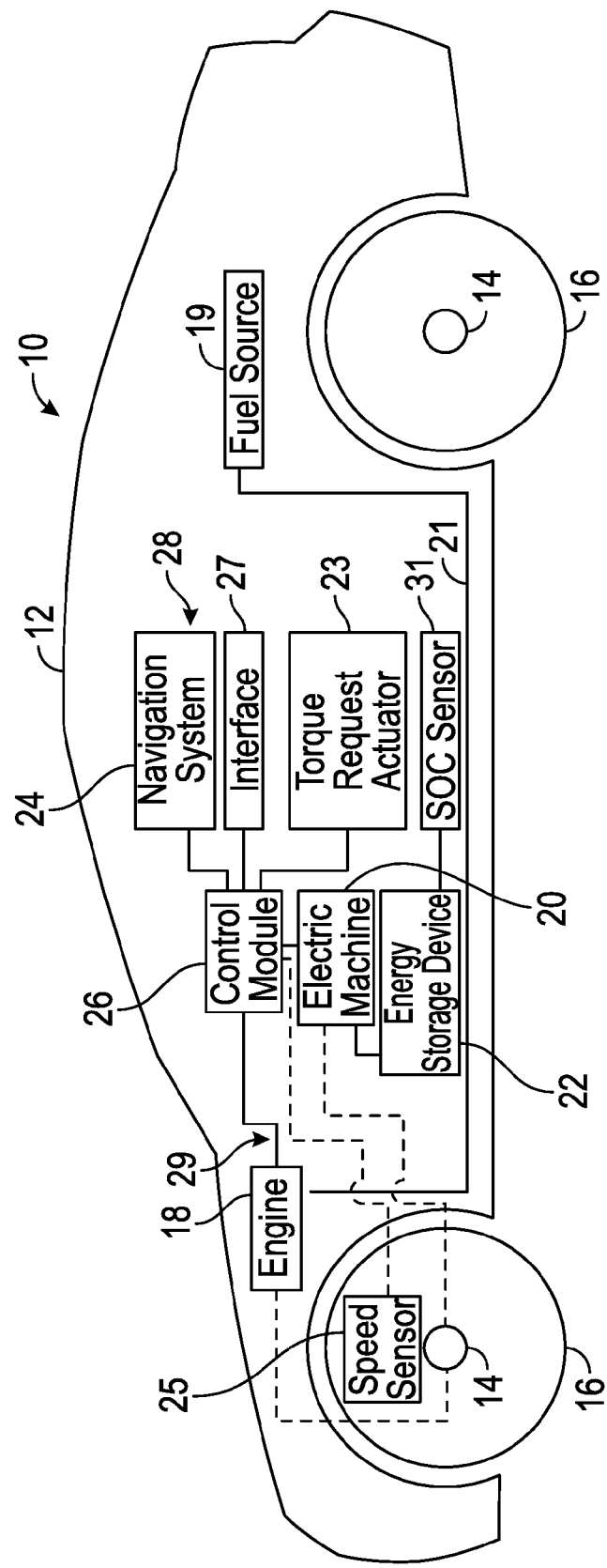
FIG. 1 is a schematic diagram of a hybrid vehicle.

Referring to the drawings in which like elements are identified with identical numerals throughout, FIG. 1 schematically illustrates a hybrid vehicle 10, such as a plug-in hybrid electric vehicle (PHEV) or an extended-range electric vehicle (EREV). In the depicted embodiment, the hybrid vehicle 10 includes a vehicle body 12 and a plurality of wheels 14 operatively coupled to the vehicle body 12. Each wheel 14 is coupled to a tire 16. The hybrid vehicle 10 further includes a hybrid powertrain 29. The hybrid powertrain 29 includes an internal combustion engine 18 operatively coupled to at least one of the wheels 14. The hybrid vehicle 10 further includes a fuel source 19, such as a fuel tank, in fluid communication with the internal combustion engine 18. A conduit 21 fluidly couples the fuel source 19 to the internal combustion engine 18. The internal combustion engine 18 is therefore fluidly coupled to the fuel source 19. The fuel source 19 contains a fuel, such as gasoline, and can therefore supply fuel to the internal combustion engine 18 via the conduit 21. In operation, the internal combustion engine 18 can combust the fuel supplied by the fuel source 19 in order to generate torque. The torque generated by the internal combustion engine 18 can be transmitted to the wheels 14 in order to propel the hybrid vehicle 10.

The hybrid powertrain 29 additionally includes at least one electric machine 20 and an energy storage device 22 electrically connected to the electric machine 20. The energy storage device 22 may be a battery, battery pack, fuel cell, or a combination thereof and can supply electrical energy to the electric machine 20. Aside from being electrically connected to the energy storage device 22, the electric machine 20 is operatively coupled to the internal combustion engine 18 and can therefore receive mechanical energy (e.g., torque) from the internal combustion engine 18. The electric machine 20 is also operatively coupled to at least one of the wheels 14 and can therefore be used to drive the wheels 14.

The electric machine 20 can operate in motoring mode and generating mode. In the motoring mode, the electric machine 20 can convert the electrical energy received from the energy storage device 22 into mechanical energy (e.g., torque). When operating in the motoring mode, the electric machine 20 can transmit mechanical energy (e.g., torque) to the wheels 14 in order to propel the hybrid vehicle 10. In the generating mode, the electric machine 20 can receive mechanical energy (e.g., torque) from the internal combustion engine 18 and convert the mechanical energy into electrical energy. The electrical energy generated by the electric machine 20 can then be transmitted to the energy storage device 22.

The hybrid powertrain 29 and hybrid vehicle 10 can operate in a charge-depletion mode. In the charge-depletion mode, the hybrid vehicle 10 only uses the electrical energy from the energy storage device 22. In other words, in the charge-depletion mode, the hybrid powertrain 29 may only use energy from the energy storage device 22 to propel the hybrid vehicle 10. Accordingly, the electrical energy stored in the energy storage device 22 is depleted when the hybrid vehicle 10 is operated in the charge-depletion mode. In other words, the hybrid vehicle 10 only uses the electrical energy stored in the energy storage device 22 when operating in the charge-depletion mode. In one example, in the charge-depletion mode, the hybrid powertrain 29 only uses power from the electric machine 20 to propel the hybrid vehicle 10. In another example, when the hybrid powertrain 29 operates in the charge-depletion mode, most of the power used to propel the hybrid vehicle 10 originates from the electric machine 20.

The hybrid powertrain 29 and hybrid vehicle 10 can also operate in a charge-sustaining mode. In the charge-sustaining mode, the hybrid vehicle 10 only uses the energy from the fuel source 19 and, therefore, the electrical energy stored in the energy storage device 22 is not depleted. As a consequence, the state of charge (SOC) of the energy storage device 22 is maintained while the hybrid vehicle 10 operates in the charge-sustaining mode. In one example, in the charge-sustaining mode, the hybrid powertrain 29 only uses power from the internal combustion engine 18 to propel the hybrid vehicle 10. In another example, when the hybrid powertrain 29 operates in the charge-sustaining mode, most of the power used to propel the hybrid vehicle 10 originates from the internal combustion engine 18.

The hybrid powertrain 29 and hybrid vehicle 10 can also operate in a blended mode. In the blended mode, the hybrid powertrain 29 uses power from the internal combustion engine 18 and the electric machine 20 to propel the hybrid vehicle 10. In other words, the hybrid powertrain 29 uses energy from the energy storage device 22 and the fuel source 19 to power the hybrid vehicle 10.

A navigation system 24 is coupled to the hybrid vehicle 10. The navigation system 24 may be part of the hybrid vehicle 10 or external to the hybrid vehicle 10. Regardless of its location, the navigation system 24 can receive input data from a user regarding a desired trip. In other words, the navigation system 24 can receive input data specific to the desired trip. The input data may include, but is not limited to, the destination of the desired trip. Upon receipt of the input data from the user, the navigation system 24 may determine the current location of the hybrid vehicle 10 and route data specific to the desired trip. The route data may include, but is not limited to, a starting point, trip route (e.g., fastest route), trip distance, and travel time. As used herein, the term "trip distance" refers to a distance from the starting point to the destination of the desired trip.

The hybrid vehicle 10 further includes a control module 26 in electronic communication with the navigation system 24, electric machine 20, and internal combustion engine 18. The terms "control module," "control," "controller," "control unit," "processor" and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), sequential logic circuit(s), input/output circuit(s) and devices, appropriate signal conditioning and buffer circuitry, and other components to provide the described functionality. "Software," "firmware," "programs," "instructions," "routines," "code," "algorithms" and similar terms mean any controller executable instruction sets including calibrations and look-up tables. The control module 26 is specifically programmed to execute the steps of the method 200 (FIG. 3), the method 300 (FIG. 4), the method 400 (FIG. 5), the method 500 (FIG. 6), the method 600 (FIG. 7), the method 700 (FIG. 8), the method 800 (FIG. 9), the method 900 (FIG. 10), the method 1000 (FIG. 11), or any combination thereof. In the present disclosure, the control module 26 includes at least one processor and at least one associated memory and can receive route data relating to the desired trip from the navigation system 24. Accordingly, the control module 26 is in electronic communication with the navigation system 24. The navigation system 24 and control module 26 may be part of a system 28 for controlling the hybrid vehicle 10. The system 28 can also be used to control the hybrid powertrain 29. As non-limiting examples, the control module 26 can be a powertrain control module that regulates operation of one or more components of the vehicle powertrain. According to one embodiment, the powertrain control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify vehicle operations occurrences.

The internal combustion engine 18, the electric machine 20, control module 26, and energy storage device 22 may be part of the hybrid powertrain 29. The hybrid powertrain 29 is configured to propel the hybrid vehicle 10. The hybrid powertrain 29 can also operate in a charge-sustaining mode and a charge-depletion mode as discussed above with respect to the hybrid vehicle 10. The control module 26 is not necessarily part of the hybrid powertrain 29.

The hybrid powertrain 29 also includes a torque request actuator 23, such as an accelerator pedal, operatively coupled to the control module 26. As such, actuation of the torque request actuator 23 causes the control module 26 to command the hybrid powertrain 29 to generate additional output torque and transmit that additional output torque to the wheels 14. As a non-limiting example, the torque request actuator 23 may be an accelerator pedal that can be depressed to request additional output torque from the hybrid powertrain 29.

The hybrid vehicle 10 further includes a speed sensor 25 capable of determining the speed of the hybrid vehicle 10. The speed sensor 25 may be an inductive or optical sensor and may be operatively coupled to the wheel 14 or the transmission of the hybrid vehicle 10. Regardless of the kind of sensor employed, the speed sensor 25 is in communication (e.g., electronic communication) with the control module 26. Accordingly, the control module 26 can receive inputs from the speed sensor 25 that are indicative of the speed of the hybrid vehicle 10 (i.e., the vehicle speed). The hybrid vehicle 10 may further includes a state of charge (SOC) sensor 31 operatively coupled to the energy storage device 22. The SOC sensor 31 is in electronic communication with the control module 26 and can determine the current SOC of the energy storage device 22. In operation, the SOC sensor 31 can generate a signal indicative of the current SOC of the energy storage device 22. Further, the SOC sensor 31 can send the generated signal to the control module 26.

Aside from the speed sensor 25, the hybrid vehicle 10 includes at least one vehicle user interface 27 in communication (e.g., electronic communication) with the control module 26. As used herein, the term "vehicle user interface" includes any suitable form of electronic device, including both hardware and software components, which is located on the vehicle and enables a vehicle user to communicate with or through a component of the hybrid vehicle 10. The vehicle user interface 27 is capable of receiving an input from a user. In response to the input from the user, the vehicle user interface 27 generates an input signal representative of the user's input. Moreover, the vehicle user interface 27 can send the input signal to the control module 26. For example, the vehicle user interface 27 may be a touch-screen or at least one button that the user (e.g., driver or passenger) can press in order to send an input signal to the control module 26. As discussed in detail below, the control module 26 can command the hybrid powertrain 29 to shift from the charge-depletion mode to the blended mode upon receipt of an input from the user through the vehicle user interface 27.

Figure 2:
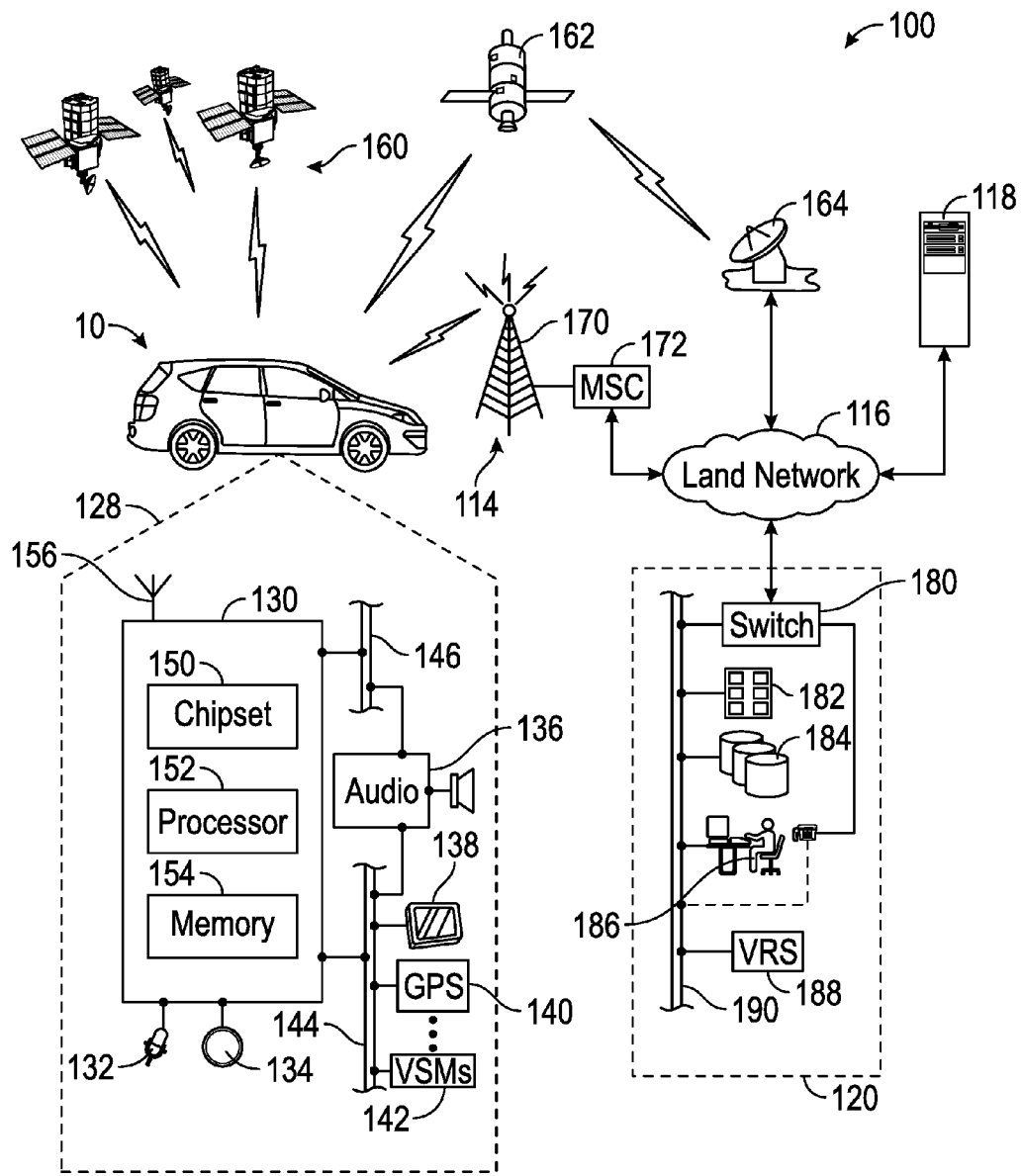
FIG. 2 is a schematic diagram depicting an exemplary embodiment of a communications system.

With reference to FIG. 2, a mobile vehicle communications system 100 can be used to implement the method 200 (FIG. 3) disclosed herein. The communications system 100 generally includes the hybrid vehicle 10, one or more wireless carrier systems 114, a land network 116, a computer 118, and a command center 120. It should be understood that the disclosed method 200 (FIG. 3) can be used with any number of different systems and is not specifically limited to the communications system 100 shown here. The following paragraphs simply provide a brief overview of one exemplary communications system 100; however, other systems not shown here could employ the disclosed method 200 (FIG. 3) as well.

The hybrid vehicle 10 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 128 are shown generally in FIG. 2 and includes a telematics unit 130, a microphone 132, one or more pushbuttons 134 or other control inputs, an audio system 136, a visual display 138, and the Global Positioning System (GPS) module 140 as well as a number of vehicle system modules (VSMs) 142 having sensors (not shown). The GPS module 140 may be part of the navigation system 24 and can determine the current location of the hybrid vehicle 10. The pushbuttons 134 and the microphone 132 may be part of the vehicle user interface 27. Some of these devices can be connected directly to the telematics unit 130 such as, for example, the microphone 132 and pushbutton(s) 134, whereas others are indirectly connected using one or more network connections, such as a vehicle bus 144 or an entertainment bus 146. Examples of suitable network connections include a controller area network (CAN), a media oriented system transfer (MOST), a local interconnection network (LIN), a local area network (LAN), and other appropriate connections such as Ethernet or other suitable networking connections.

The telematics unit 130 enables wireless voice and/or data communication over the wireless carrier system 114 and via wireless networking so that the hybrid vehicle 10 can communicate with the command center 120, other telematics-enabled vehicles, or some other entity or device. The telematics unit 130 uses radio transmissions to establish a communications channel (a voice channel and/or a data channel) with the wireless carrier system 114 so that voice and/or data transmissions can be sent and received over the channel. By providing both voice and data communication, the telematics unit 130 enables the hybrid vehicle 10 to offer a number of different services including those related to navigation, telephony, emergency assistance, diagnostics, infotainment, etc. Data can be sent either via a data connection, such as via packet data transmission over a data channel, or via a voice channel. This includes the communication of data in text format using short message service (SMS) messages. For combined services that involve both voice communication (e.g., with a live advisor or voice response unit at the command center 120) and data communication (e.g., to provide GPS location data or vehicle diagnostic data to the command center 120), the communications system 100 can utilize a single call over a voice channel and switch as needed between voice and data transmission over the voice channel.

According to one embodiment, the telematics unit 130 utilizes cellular communication according to either Global System for Mobile Communications (GSM) or Code Division Multiple Access (CDMA) standards and thus includes a standard cellular chipset 150 for voice communications like hands-free calling, a wireless modem for data transmission, a processor 152, one or more memories 154, and a dual antenna 156. Using these components, the telematics unit 130 can transmit and/or receive data or commands via the various communication approaches noted above, including via SMS messages, wherein the data can be incorporated into, for example, the text message portion (payload) of the SMS message. It should be appreciated that the modem can either be implemented through software that is stored in the telematics unit 130 and is executed by the processor 152, or it can be a separate hardware component located internal or external to the telematics unit 130. The modem can operate using any number of different standards or protocols such as Enhanced Voice-Data Optimized (EVDO), CDMA, General Packet Radio Service (GPRS), and Enhanced Data Rates for GSM Evolution (EDGE). Wireless networking between the vehicle and other networked devices can also be carried out using the telematics unit 130. For this purpose, the telematics unit 130 can be configured to communicate wirelessly according to one or more wireless protocols, such as any of the IEEE 802.11 protocols, WiMAX, or Bluetooth. When used for packet-switched data communication such as TCP/IP, the telematics unit 130 can be configured with a static IP address or can set up to automatically receive an assigned IP address from another device on the network such as a router or from a network address server.

The processor 152 can be any type of device capable of processing electronic instructions including microprocessors, microcontrollers, host processors, controllers, vehicle communication processors, and application specific integrated circuits (ASICs). Further, the processor 152 can be exclusively dedicated for the telematics unit 130 or can be shared with other vehicle systems. The processor 152 executes various types of digitally-stored instructions, such as software or firmware programs stored in the memory 154, which enable the telematics unit 130 to provide a wide variety of services. For instance, the processor 152 can execute programs or process data to carry out at least a part of the method 200 (FIG. 3) discussed herein. In one embodiment, the processor 152 receives data from the VSMs 142 and segregates the data between traffic related data and non-traffic related data. With the traffic related data, the processor 152 can further correlate or classify the traffic related data based on the type of traffic data it is. For example, the hybrid vehicle 10 may slow down for a period of time. This data is different than airbag deployment data. The former example identifies increased traffic and the second signifies a possible traffic accident. As is discussed below, this information can be transmitted to the command center 120 using the cellular chipset 150.

The telematics unit 130 can be used to provide a diverse range of vehicle services that involve wireless communication to and/or from the vehicle. Such services include: turn-by-turn directions and other navigation-related services that are provided in conjunction with the GPS module 140; airbag deployment notification and other roadside assistance-related services that are provided in connection with one or more sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of the telematics unit 130, but are simply an enumeration of some of the services that the telematics unit 130 is capable of offering. As noted above, the transmission of information from the hybrid vehicle 10 to the command center 120 or other location can be carried out in various ways including via SMS messages containing the transmitted data. Building and sending of SMS messages containing vehicle data can be done in response to a request at the telematics unit 130 to send the vehicle data. This request can be the result of a trigger occurring event or can be a present request received from the command center 120 or other remote facility.

At least some of the aforementioned VSMs 142 can be implemented in the form of software instructions saved internal or external to the telematics unit 130. Alternatively or additionally, the VSMs 142 could be hardware components located internal or external to the telematics unit 130. Further, the VSMs 142 could be integrated and/or shared with each other or with other systems located throughout the hybrid vehicle 10. In the event that the modules are implemented as VSMs 142 located external to the telematics unit 130, they could utilize the vehicle bus 144 to exchange data and commands with the telematics unit 130.

GPS module 140 receives radio signals from a plurality of GPS satellites 160. From these signals, the GPS module 140 can determine the current vehicle location that is used for providing navigation and other position-related services to the vehicle operator. Navigation information can be presented on the visual display 138 (or other display within the hybrid vehicle 10) or can be presented verbally such as is done when supplying turn-by-turn navigation. The navigation services can be provided using a dedicated in-vehicle navigation module (which can be part of the GPS module 140), or some or all navigation services can be done via the telematics unit 130, wherein the vehicle location information is sent to a remote location for purposes of providing the vehicle with navigation maps, map annotations (points of interest, restaurants, etc.), route calculations, and the like. The vehicle location information can be supplied to the command center 120 or other remote computer system, such as computer 118, for other purposes, such as fleet management. Also, new or updated map data can be downloaded to the GPS module 140 from the command center 120 via the telematics unit 130.

Apart from the audio system 136 and GPS module 140, the hybrid vehicle 10 can include other vehicle system modules (VSMS) 142 in the form of electronic hardware components that are located throughout the hybrid vehicle 10 and typically receive input from one or more sensors and use the sensed input to perform diagnostic, monitoring, control, reporting and/or other functions. Each of the VSMs 142 is connected by the vehicle bus 44 to the other VSMs, as well as to the telematics unit 130, and can be programmed to run vehicle system and subsystem diagnostic tests.

The vehicle electronics 128 also includes a number of vehicle user interfaces 27 that allow vehicle occupants to provide and/or receive information, including microphone 132, pushbuttons(s) 134, audio system 136, and visual display 138. As used herein, the term 'vehicle user interface' broadly includes any suitable form of electronic device, including both hardware and software components, which is located on the vehicle and enables a vehicle user to communicate with or through a component of the hybrid vehicle 10. The microphone 132 provides audio input to the telematics unit 130 to enable the driver or other occupant to provide voice commands and carry out hands-free calling via the wireless carrier system 114. For this purpose, it can be connected to an on-board automated voice processing unit utilizing human-machine interface (HMI) technology. The pushbutton(s) 134 allow manual user input into the telematics unit 130 to initiate wireless telephone calls and provide other data, response, or control input. Separate pushbuttons can be used for initiating emergency calls versus regular service assistance calls to the command center 120. The audio system 136 provides audio output to a vehicle occupant and can be a dedicated, stand-alone system or part of the primary vehicle audio system. According to the particular embodiment shown here, the audio system 136 is operatively coupled to both vehicle bus 144 and entertainment bus 146 and can provide AM, FM and satellite radio, CD, DVD and other multimedia functionality. This functionality can be provided in conjunction with or independent of the infotainment module described above. The visual display 138 may be a graphics display, such as a touch screen on the instrument panel or a heads-up display reflected off of the windshield, and can be used to provide a multitude of input and output functions. Various other vehicle user interfaces can also be utilized.

The wireless carrier system 114 is a cellular telephone system that includes a plurality of cell towers 170 (only one shown), one or more mobile switching centers (MSCs) 172, as well as any other networking components required to connect wireless carrier system 114 with the land network 116. Each cell tower 170 includes sending and receiving antennas and a base station, with the base stations from different cell towers being connected to the MSC 172 either directly or via intermediary equipment such as a base station controller. The wireless carrier system 114 can implement any suitable communications technology, including for example, analog technologies such as AMPS, or the newer digital technologies such as CDMA (e.g., CDMA2000) or GSM/GPRS. Various cell tower/base station/MSC arrangements are possible and could be used with wireless carrier system 114. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 114, a different wireless carrier system in the form of satellite communication can be used to provide uni-directional or bi-directional communication with the hybrid vehicle 10. This can be done using one or more communication satellites 162 and an uplink transmitting station 164. Uni-directional communication can be, for example, satellite radio services, wherein programming content (news, music, etc.) is received by the transmitting station 164, packaged for upload, and then sent to the communication satellite 162, which broadcasts the programming to subscribers. Bi-directional communication can be, for example, satellite telephony services using the communication satellite 162 to relay telephone communications between the hybrid vehicle 10 and station 64. If used, this satellite telephony can be utilized either in addition to or in lieu of the wireless carrier system 114.

The land network 116 may be a conventional land-based telecommunications network that is connected to one or more landline telephones and connects wireless carrier system 114 to the command center 120. For example, the land network 116 may include a public switched telephone network (PSTN) such as that used to provide hardwired telephony, packet-switched data communications, and the Internet infrastructure. One or more segments of the land network 116 could be implemented through the use of a standard wired network, a fiber or other optical network, a cable network, power lines, other wireless networks such as wireless local area networks (WLANs), or networks providing broadband wireless access (BWA), or any combination thereof. Furthermore, the command center 120 need not be connected via the land network 116, but could include wireless telephony equipment so that it can communicate directly with a wireless network, such as wireless carrier system 114.

The computer 118 can be one of a number of computers accessible via a private or public network such as the Internet. Each computer 118 can be used for one or more purposes, such as a web server accessible by the vehicle via the telematics unit 130 and wireless carrier system 114. Other such accessible computers 118 can be, for example: a service center computer where diagnostic information and other vehicle data can be uploaded from the vehicle via the telematics unit 130; a client computer used by the vehicle owner or other subscriber for such purposes as accessing or receiving vehicle data or setting up or configuring subscriber preferences or controlling vehicle functions; or a third party repository to or from which vehicle data or other information is provided, whether by communicating with the hybrid vehicle 10 or the command center 120, or both. A computer 118 can also be used for providing Internet connectivity such as Domain Name System (DNS) services or as a network address server that uses Dynamic Host Control Protocol (DHCP) or other suitable protocol to assign an IP address to the hybrid vehicle 10.

The command center 120 is designed to provide the vehicle electronics 128 with a number of different system back-end functions and, according to the exemplary embodiment shown here, generally includes one or more switches 180, servers 182, databases 184, live advisors 186, as well as an automated voice response system (VRS) 188. These various command center components are preferably coupled to one another via a wired or wireless local area network 190. The switch 180, which can be a private branch exchange (PBX) switch, routes incoming signals so that voice transmissions are usually sent to either the live advisor 186 by regular phone or to the automated voice response system 188 using Voice over Internet Protocol (VoIP). The live advisor phone can also use VoIP as indicated by the broken line in FIG. 2. VoIP and other data communication through the switch 180 is implemented via a modem (not shown) connected between the switch 180 and local area network 190. Data transmissions are passed via the modem to the server 182 and/or the database 184. The database 184 can store account information such as subscriber authentication information, vehicle identifiers, profile records, behavioral patterns, and other pertinent subscriber information. Data transmissions may also be conducted by wireless systems, such as, GPRS, and the like. Although the illustrated embodiment has been described as it would be used in conjunction with a manned command center 120 using live advisor 186, it will be appreciated that the command center 120 can instead utilize VRS 188 as an automated advisor or, a combination of VRS 188 and the live advisor 186 can be used.

Figure 3:
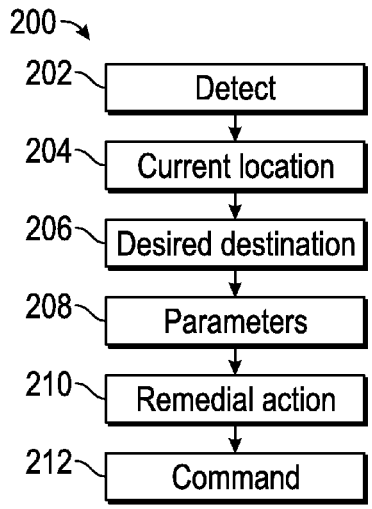
FIG. 3 is a flowchart of a method for controlling the hybrid vehicle of FIG. 1.

FIG. 3 is a flowchart of a method 200 for controlling the hybrid vehicle 10 in order to execute a remedial action using the communications system 100 after the hybrid vehicle 10 has experienced a loss of propulsion. In the present disclosure, the term "remedial action" is an action that allows the hybrid vehicle 10 to travel from its current location to a predetermined location after the hybrid vehicle 10 has experienced a loss of propulsion. The predetermined location may be a desired destination by the vehicle operator (i.e., the desired destination) or another suitable destination such as the gas station that is closest to the hybrid vehicle 10 (i.e., the alternative destination). The method 200 begins with step 202, which entails detecting, via the control module 26, a loss of propulsion in the hybrid vehicle 10. The loss of propulsion may be purposeful. That is, the control module 26 can command the hybrid powertrain 29 to decrease or stop its torque output in response to the predetermined vehicle operating condition. For example, the control module 26 can command the hybrid powertrain 29 to shut down if the control module 26 determines that the airbags were deployed. Because the control module 26 actually commands the hybrid powertrain 29 to stop generating output torque, the control module 26 can therefore detect the loss of propulsion. Alternatively, the control module 26 can detect a loss of propulsion in the hybrid vehicle 10 based, at least in part, on input from the speed sensor 25. For instance, the control module 26 can detect a loss of propulsion in the hybrid vehicle 10 if the vehicle speed reaches zero or if the deceleration of the hybrid vehicle 10 is equal to or greater than a predetermined deceleration threshold. As discussed above, the control module 26 can determine the vehicle speed and deceleration based on inputs from the speed sensor 25. Regardless of how the loss of propulsion is detected, the control module 26 communicates the occurrence of such loss of propulsion to the command center 120 in step 202. Therefore, the control module 26 is programmed to detect a loss of propulsion in the hybrid powertrain 29 and communicate the occurrence of such loss of propulsion to the command center 120. Next, the method 200 continues to step 204.

Step 204 entails sending data indicative of the current location of the hybrid vehicle 10 (i.e., the current location data) to the command center 120 after the hybrid vehicle 10 has experienced a loss of propulsion. The GPS module 140 can determine the current location of the hybrid vehicle 10 and then send the current location data to the command center 120. The current location data can be sent to the command center 120 via the control module 26 or the telematics unit 130. Thus, the control module 26 and/or the telematics unit 130 can be programmed to determine the current location of the hybrid vehicle 10 after the hybrid vehicle 10 has experienced a loss of propulsion based, at least in part, on the input from the GPS module 140. Furthermore, the control module 26 and/or the telematics unit 130 can be programmed to send the current location data to the command center 120. Then, the method 200 proceeds to step 206.

Step 206 entails sending data indicative of a desired destination to the command center 120 (i.e., the desired destination data) after the hybrid vehicle 10 has experienced the loss of propulsion. The desired destination data includes, but is not limited to, the geographical location of the destination desired by the vehicle operator, the distance from the current location of the hybrid vehicle 10 to the desired destination, the route to be traveled to reach the desired destination, and speed constraints along the determined route. The control module 26 and/or telematics unit 130 is programmed to send the desired destination data to the command center 120. The vehicle user can input the desired destination using the vehicle user interface 27. The GPS module 140 of the hybrid vehicle 10 can determine the route to be traveled to reach the desired destination and the distance from the current location of the hybrid vehicle 10 to the desired destination along the route. Alternatively, the command center 120 can determine the route to be traveled to reach the desired destination and the distance from the current location of the hybrid vehicle 10 to the desired destination along the route. Next, the method 200 continues to step 208.

Step 208 entails sending vehicle operating parameters from the hybrid vehicle 10 to the command center 120. In the present disclosure, the term "vehicle operating parameters" refers to parameters representative of the operation of the vehicle. As non-limiting examples, the vehicle operating parameters include the current SOC of the energy storage device 22, the amount of fuel in the fuel source 19 (e.g., fuel tank), the current torque output capability and/or discharge power of the hybrid powertrain 29, and any derate condition of the electric machine 20. Step 208 further entails sending diagnostic data from the hybrid vehicle 10 to the command center 120. The term "diagnostic data" refers to data indicative of a condition in the hybrid powertrain 29 that precludes the hybrid powertrain 29 from performing to design. For instance, the "diagnostic data" includes, but is not limited to, data indicative of conditions of the energy storage device 22, the electric machine 20, the internal combustion engine 18, hydraulic system (not shown) of the hybrid vehicle 10, and electric system (not shown) of the hybrid vehicle 10 that prevent these systems or devices from operating as intended. In summary, the control module 26 and/or telematics unit 130 are programmed to send vehicle operating parameters and diagnostic data to the command center 120 after the hybrid vehicle 10 has experienced the loss of propulsion. Then, the method 200 proceeds to step 210.

Step 210 entails determining a remedial action in order to allow the hybrid vehicle 10 to reach the predetermined destination (e.g., desired destination) after the hybrid vehicle 10 has experienced the loss in propulsion. In the present disclosure, the term "remedial action" means an action that can be performed by the hybrid vehicle 10 in order to reach a predetermined location, such as the desired destination or an alternative destination, despite the loss of propulsion. The command center 120 can determine the remedial action based, at least in part, on the vehicle operating parameters, the diagnostic data, the current location of the hybrid vehicle 10, and the desired destination. After determining the appropriate remedial action, the command center 120 sends a remedial action command to the hybrid vehicle 10. In step 210, the hybrid vehicle 10 receives the remedial action command corresponding to the remedial action determined by the command center 120. In particular, the telematics unit 130 and/or the control module 26 can receive the remedial action command. The method 200 then proceeds to step 212.

Step 212 entails commanding the hybrid powertrain 29 to perform the remedial action that corresponds to the remedial action command received from the command center 120. The remedial action allows the hybrid vehicle 10 to travel from its current location to the predetermined location, such as the desired destination or a predetermined alternative destination, after the hybrid vehicle 10 has experienced the loss of propulsion.

Figure 4:
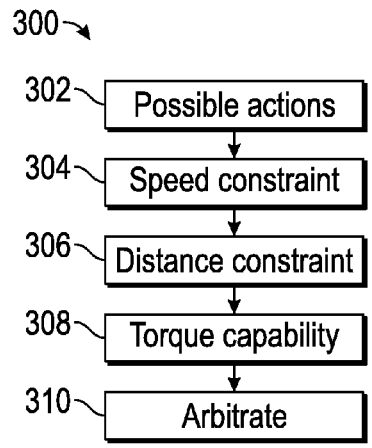
FIG. 4 is a flowchart of a method for determining a remedial action after the hybrid vehicle has experienced a loss of propulsion.

FIG. 4 is a flowchart of a method 300 for determining the most suitable remedial action (i.e., the selected remedial action) based, at least in part, on the vehicle operating parameters, the diagnostic data, the current location of the hybrid vehicle 10, and the desired destination. As discussed above with respect to step 210 of method 200 (FIG. 3), the command center 120 can determine the remedial action that allows the hybrid vehicle 10 to reach the predetermined location (e.g., the desired destination). To do so, the method 300 can be employed. The command center 120, the control module 26, and/or the telematics unit 130 can be programmed to execute the steps of the method 300.

The method 300 begins at step 302, which entails determining possible remedial actions based, at least in part, on the vehicle operating parameters and the diagnostic data. The command center 120 can be programmed to determine possible remedial actions as discussed in detail below. Step 302 also entails determining which remedial actions have to be blocked based, at least in part, on the vehicle operating parameters and the diagnostic data. The command center 120 can be programmed to determine the blocked remedial actions. Then, the method 300 continues to step 304.

Step 304 entails determining the speed constraint for the hybrid vehicle 10 based, at least in part, on the vehicle operating parameters and the diagnostic data as discussed in detail below. In the present disclosure, the term "speed constraint" refers to the maximum speed that the hybrid vehicle 10 can achieve considering the vehicle operating parameters and the diagnostic data. The server 182 of the command center 120 is programmed to determine the speed constraint of the hybrid vehicle 10 as discussed below. In doing so, the server 182 takes into account the vehicle operating parameters previously sent from the control module 26 to the command center 120. Then, the method 300 proceeds to step 306.

Step 306 entails determining the distance constraint for the hybrid vehicle 10 based, at least in part, on the vehicle operating parameters and the diagnostic data as discussed in detail below. In the present disclosure, the term "distance constraint" refers to the maximum distance that the hybrid vehicle 10 can travel considering the vehicle operating parameters and the diagnostic data. The server 182 of the command center 120 is programmed to determine the distance constraint for the hybrid vehicle 10 as discussed below. Then, the method 300 continues to step 308.

Step 308 entails determining the torque capability and discharge power limit of the hybrid powertrain 29 based, at least in part, on the vehicle operating parameters, the diagnostic data, the speed constraint determined in step 304, and the distance constraint determined in step 306 as discussed in detail below. As used herein, the term "torque capability" means the maximum torque output that the hybrid powertrain 29 can generate considering the vehicle operating parameters and the diagnostic data. The term "discharge power limit" means the maximum power that the electric machine 20 can generate taking into account the vehicle operating parameters and diagnostic data. The server 182 of the command center 120 is programmed to determine the torque capability and the discharge power limit as discussed below. After determining the torque capability and discharge power limit, the method 300 continues to step 310.

Step 310 entails arbitrating among the possible remedial actions in order to select a remedial action command that is most suitable to reach the desired destination (i.e., the selected remedial action command). The command center 120 considers the torque capability and discharge power limit of the hybrid powertrain 29, the vehicle operating parameters, the diagnostic data, the speed constraint determined in step 304, and the distance constraint determined in step 306 to select the remedial action command (i.e., the selected remedial action command).

Figure 5:
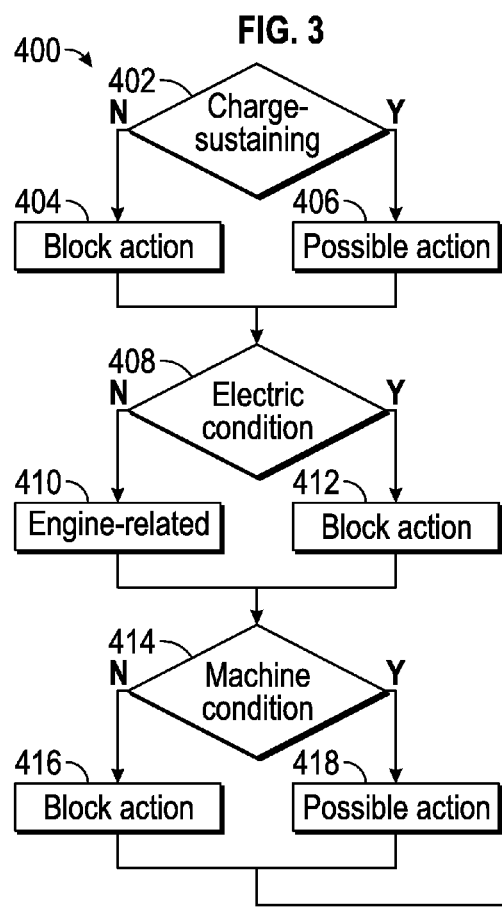
FIG. 5 is a flowchart of a method for determining possible remedial actions after the hybrid vehicle has experienced the loss of propulsion.
Figure 5:
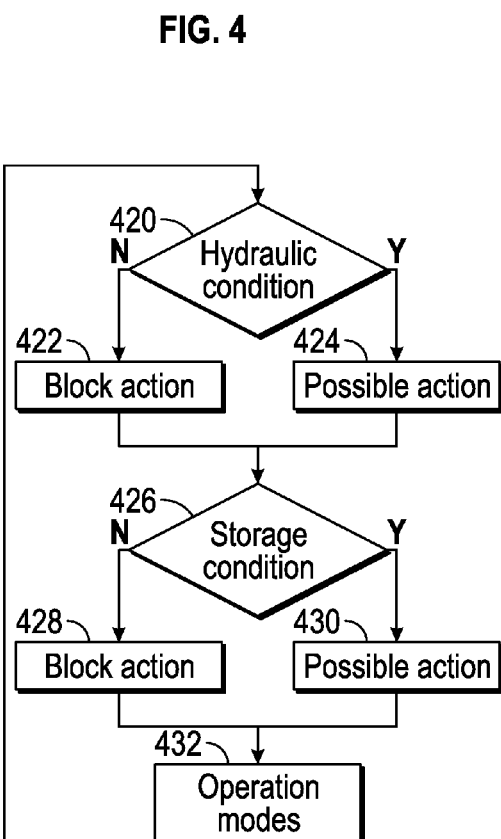

FIG. 5 is a flowchart for determining possible remedial actions. As discussed above with respect to step 302 of the method 300 (FIG. 4), the command center 120 can determine possible remedial actions based, at least in part, on the vehicle operating parameters and the diagnostic data. To do so, the command center 120 can execute the method 400.

The method 400 begins with step 402, which entails determining whether the hybrid vehicle 10 can be driven in the charge-sustaining mode despite the loss of propulsion. As discussed above, in the charge-sustaining mode, the hybrid vehicle 10 only uses the energy from the fuel source 19 and, therefore, the electrical energy stored in the energy storage device 22 is not depleted. As a consequence, the state of charge (SOC) of the energy storage device 22 is maintained while the hybrid vehicle 10 operates in the charge-sustaining mode. In one example, in the charge-sustaining mode, the hybrid powertrain 29 only uses power from the internal combustion engine 18 to propel the hybrid vehicle 10. If the command center 120 determines that the hybrid vehicle 10 cannot be driven in the charge-sustaining mode, then the method 400 proceeds to step 404. In step 404, the command center 120 designates a charge-sustaining remedial action as a blocked remedial action. As used herein, the "charge-sustaining remedial action" refers to a remedial action that allows the hybrid vehicle 10 to travel from its current location to the desired destination while the hybrid vehicle 10 operates in the charge-sustaining mode. If the command center 120 determines that the hybrid vehicle 10 can be driven in the charge-sustaining mode, then the method 400 proceeds to step 406. In step 406, the command center 120 designates the charge-sustaining remedial action as one of the possible remedial actions. After either step 404 or step 406, the method 400 proceeds to step 408.

Step 408 entails determining whether there are any electric system conditions that prevent engine operation. The command center 120 can determine whether there are any electric system conditions that prevent engine operation based on the vehicle operating parameters and diagnostic data. If the command center 120 determines that there are no electric system conditions that prevent engine operation, then the method 400 continues to step 410. In step 410, the command center 120 designates an engine related remedial action as one of the possible remedial actions. In the present disclosure, the term "engine related remedial action" refers to a remedial action that involves the operation of the internal combustion engine 18 to propel the hybrid vehicle 10. If the command center 120 determines that there is an electric system condition that prevents engine operation, then the method 400 proceeds to step 412. In step 412, the command center 120 designates the engine related remedial action as a blocked remedial action. After either step 410 or step 412, the method 400 continues to step 414.

Step 414 entails determining whether there are any electric machine conditions that prevent the hybrid vehicle 10 from operating in the charge-depletion mode. As discussed above, the hybrid vehicle 10 only uses the electrical energy from the energy storage device 22 when operating in the charge-depletion mode. If the command center 120 identifies electric machine conditions that prevent the hybrid vehicle 10 from being driven in the charge-depletion mode, then the method 400 proceeds to step 416. In step 416, the command center 120 designates the charge-sustaining remedial action as a blocked remedial action. If the command center 120 does not identify electric machine conditions that prevent the hybrid vehicle 10 from being driven in the charge-depletion mode, then the method 400 proceeds to step 418. In step 418, the command center 120 designates the charge-depletion remedial action as one of the possible remedial actions. As used herein, the term "charge-depletion remedial action" refers to a remedial action that allows the hybrid vehicle 10 to travel from its current location to a predetermined location, such as the desired destination, while operating in the charge-depletion mode. After either step 416 or step 418, the method 400 proceeds to step 420.

Step 420 entails determining whether there are any hydraulic conditions that prevent the hybrid vehicle 10 from operating in the charge-depletion mode. If the command center 120 determines that there are hydraulic conditions that prevent the hybrid vehicle 10 from being driven in the charge-depletion mode, then the method 400 proceeds to step 422. In step 422, the command center 120 designates the charge-sustaining remedial action as a blocked remedial action. This designation overrides the designation made in step 418. If the command center 120 does not identify hydraulic conditions that prevent the hybrid vehicle 10 from being driven in the charge-depletion mode, then the method 400 proceeds to step 424. In step 424, the command center 120 designates the charge-depletion remedial action as one of the possible remedial actions. After either step 422 or step 424, the method 400 proceeds to step 426.

Step 426 entails determining whether there are any energy storage conditions that prevent the hybrid vehicle 10 from operating in the charge-depletion mode. If the command center 120 determines that there are energy storage conditions that prevent the hybrid vehicle 10 from being driven in the charge-depletion mode, then the method 400 proceeds to step 428. In step 428, the command center 120 designates the charge-sustaining remedial action as a blocked remedial action. This designation overrides the designation made in steps 418 and 424. If the command center 120 does not identify energy storage conditions that prevent the hybrid vehicle 10 from being driven in the charge-depletion mode, then the method 400 proceeds to step 430. In step 430, the command center 120 designates the charge-depletion remedial action as one of the possible remedial actions. After either step 428 or step 430, the method 400 proceeds to step 432.

Step 432 entails determining all possible vehicle operation modes based, at least in part, on the possible remedial actions determined in the previous steps. As non-limiting examples, the possible vehicle operation modes include a generator mode, a reduced battery power mode, and a generator function inoperative mode, among others. The vehicle operation mode is intrinsically linked with the possible remedial actions determined in the previous steps.

Figure 6:
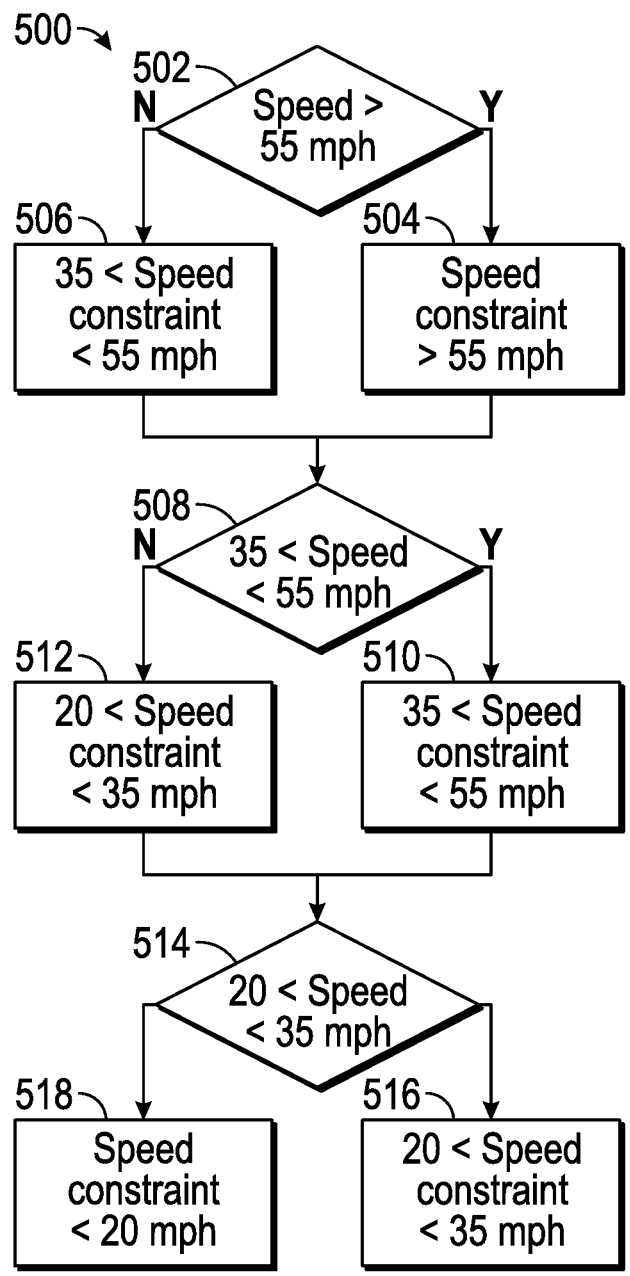
FIG. 6 is a flowchart for determining vehicle speed constraints of the hybrid vehicle.

FIG. 6 is a flowchart for determining vehicle speed constraints. As discussed above with respect to step 304 of the method 300 (FIG. 4), the command center 120 can determine the speed constraint for the hybrid vehicle 10 based, at least in part, on the vehicle operating parameters and the diagnostic data. To do so, the command center 120 can execute the method 500.

The method 500 begins with step 502, which entails determining whether the hybrid vehicle 10 can drive at speeds greater than fifty-five (55) miles per hour (mph) in the charge-depletion mode. A vehicle speed greater than fifty-five (55) miles per hour may be referred to as interstate highway speed. If the hybrid vehicle 10 can be driven at speeds greater than fifty-five (55) miles per hour in the charge-depletion mode, then the method 500 proceeds to step 504. In step 504, the command center 120 sets the vehicle speed constraint as any speed greater than fifty-five (55) miles per hour (i.e., the interstate highway speed). If the command center 120 determines that the hybrid vehicle 10 cannot be driven at speeds greater than fifty-five (55) miles per hour in the charge-depletion mode, then the method 500 proceeds to step 506. In step 506, the command center 120 sets the vehicle speed constraint as a range between thirty-five (35) miles per hour and fifty-five (55) miles per hour. Next, the method 500 continues to step 508.

Step 508 entails determining whether the hybrid vehicle 10 can drive at speeds between thirty-five (35) and fifty-five (55) miles per hour in the charge-depletion mode. A vehicle speed between thirty-five and fifty-five (55) miles per hour may be referred to as local highway speed. If the hybrid vehicle 10 can be driven at speeds between thirty-five (35) and fifty-five (55) miles per hour in the charge-depletion mode, then the method 500 proceeds to step 510. In step 510, the command center 120 sets the vehicle speed constraint as any speed between thirty-five (35) and fifty-five (55) miles per hour (i.e., the local highway speed). If the command center 120 determines that the hybrid vehicle 10 cannot be driven at speeds between thirty-five (35) and fifty-five (55) miles per hour in the charge-depletion mode, then the method 500 proceeds to step 512. In step 512, the command center 120 sets the vehicle speed constraint as a range between twenty and thirty-five (35) miles per hour. Next, the method 500 continues to step 514.

Step 514 entails determining whether the hybrid vehicle 10 can drive at speeds between twenty (20) and thirty-five (35) miles per hour in the charge-depletion mode. A vehicle speed between twenty (20) and thirty-five (35) miles per hour may be referred to as city traffic speed. If the hybrid vehicle 10 can be driven at speeds between twenty (20) and thirty-five (35) miles per hour in the charge-depletion mode, then the method 500 proceeds to step 516. In step 516, the command center 120 sets the vehicle speed constraint as any speed between twenty (20) and thirty-five (35) miles per hour (i.e., the city traffic speed). If the command center 120 determines that the hybrid vehicle 10 cannot be driven at speeds between twenty (20) and thirty-five (35) miles per hour in the charge-depletion mode, then the method 500 proceeds to step 518. In step 518, the command center 120 sets the vehicle speed constraint as any speed that is less than twenty (20) miles per hour (i.e., the creep speed). The term "speed constraint" may also be referred to as allowable speed range.

Figure 7:
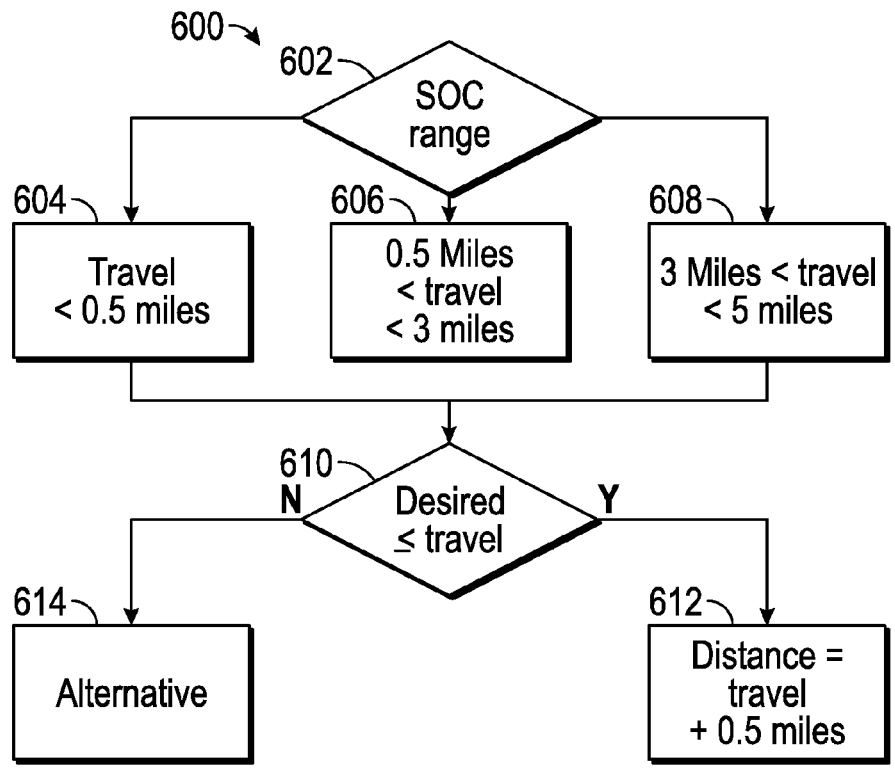
FIG. 7 is a flowchart of a method for determining distance constraints of the hybrid vehicle.

FIG. 7 is a flowchart of a method 600 for determining distance constraint for the hybrid vehicle 10. As discussed above with respect to step 306 of the method 300 (FIG. 4), the command center 120 can determine the distance constraint for the hybrid vehicle 10 based, at least in part, on the vehicle operating parameters and the diagnostic data. To do so, the command center 120 can execute the method 600.

The method 600 begins with step 602, which entails determining the scaled usable SOC range based on input from the SOC sensor 31. The "scaled usable SOC range" means a range of the distance that the hybrid vehicle 10 can travel using electrical energy from the energy storage device 22 taking into account energy losses. In step 602, the command center 120 can determine that the scaled usable SOC range is less than, within, or greater than a predetermined range. If the scaled usable SOC range is less than the predetermined range, then the method 600 proceeds to step 604. In step 604, the command center 120 sets the travel radius to be less than a predetermined distance (e.g., 0.5 miles). In the present disclosure, the "travel radius" refers to the distance that can be traveled by the hybrid vehicle 10 taking into account the vehicle operating parameters, such as the current SOC of the energy storage device 22 and/or the amount of fuel in the fuel source 19. If the scaled usable SOC range is within the predetermined range, then the method 600 continues to step 606. In step 606, the command center 120 sets the travel radius as a range between 0.5 miles and 3 miles. If the scaled usable SOC range is less than the predetermined range, then the method 600 proceeds to step 608. In step 608, the command center 120 sets the travel radius as a range between 3 miles and 5 miles. After executing steps 604, 606, or 608, the method 600 continues to step 610.

Step 610 entails determining whether the desired destination is within the travel radius determined in steps 604, 606, or 608 with respect to the current location of the hybrid vehicle 10. If the distance from the current location of the hybrid vehicle 10 to the desired destination (i.e., the requested distance) is within the travel radius set in steps 604, 606, or 608, then the method 600 proceeds to step 612. In step 612, the command center 120 sets the allowable travel radius to be slightly greater than the requested distance. For instance, in step 612, the command center 120 can set the allowable travel radius to be 0.5 miles greater than the requested distance. If the requested distance is greater than travel radius set in steps 604, 606, or 608, then the method 600 proceeds to step 614. In step 614, the command center 120 determines alternative destinations within the travel radius determined in steps 604, 606, or 608 and then communicates those alternative destinations to the vehicle operator. For example, the command center 120 can communicate alternative destinations to the vehicle operator via the audio system 136 and/or a visual display 138.

Figure 8:
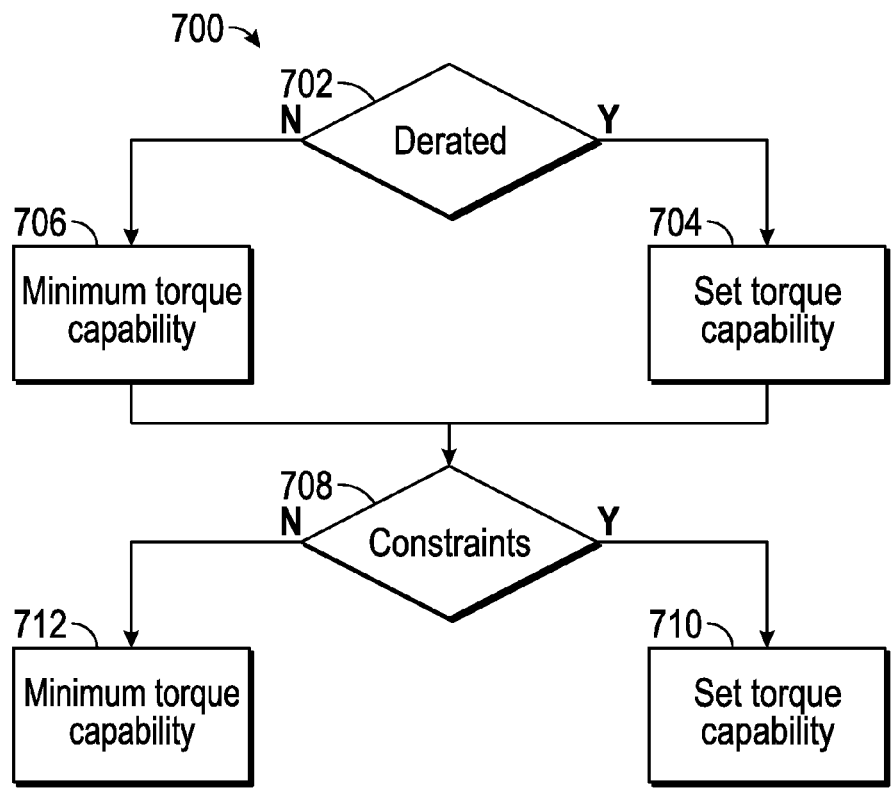
FIG. 8 is a flowchart of a method for determining torque capability of the hybrid vehicle.

FIG. 8 is a flowchart of a method 700 for determining torque capability and discharge power limit for the hybrid vehicle 10. As discussed above with respect to step 308 of the method 300 (FIG. 4), the command center 120 can determine the torque capability and discharge power limit of the hybrid powertrain 29 based, at least in part, on the vehicle operating parameters, the diagnostic data, the speed constraint determined using the method 500, and the distance constraint determined using the method 600. To do so, the command center 120 can execute the method 700.

The method 700 begins with step 702, which entails determining whether any of the internal combustion engine 18, the electric machine(s) 20, or the energy storage device 22 is derated. As used herein, the term "derated" means that a device is purposefully performing below its maximum capability in accordance with a predetermined control algorithm. If any of the internal combustion engine 18, the electric machine(s) 20, or the energy storage device 22 is derated, then the method 700 continues to step 704. In step 704, the command center 120 commands the control module 26 to select the torque capability and discharge power limit. If none of the internal combustion engine 18, the electric machine(s) 20, or the energy storage device 22 are derated, then the method 700 proceeds to step 706. In step 706, the command center 120 sets the torque capability and discharge power limit to the minimum for all possible remedial actions determined using the method 400. After performing either step 704 or step 706, the method 700 continues to step 708.

Step 708 entails determining if the torque capability and discharge power limit determined in either step 704 or step 706 allows the hybrid vehicle 10 to travel under the speed constraint determined using the method 500 and the distance constraint determined using the method 600. If the torque capability and discharge power limit determined in either step 704 or step 706 allows the hybrid vehicle 10 to travel under the speed constraint determined using the method 500 and the distance constraint determined using the method 600, then the method 700 proceeds to step 710. In step 710, the command center 120 communicates the torque capability and discharge power limit determined in either step 704 or step 706 to the control module 26. If the torque capability and discharge power limit determined in either step 704 or step 706 does not allow the hybrid vehicle 10 to travel under the speed constraint determined using the method 500 and the distance constraint determined using the method 600, then the method 700 continues to step 712. In step 712, the command center 120 sets the torque capability and discharge power limit to the minimum for all possible remedial actions determined using the method 400.

Figure 9:
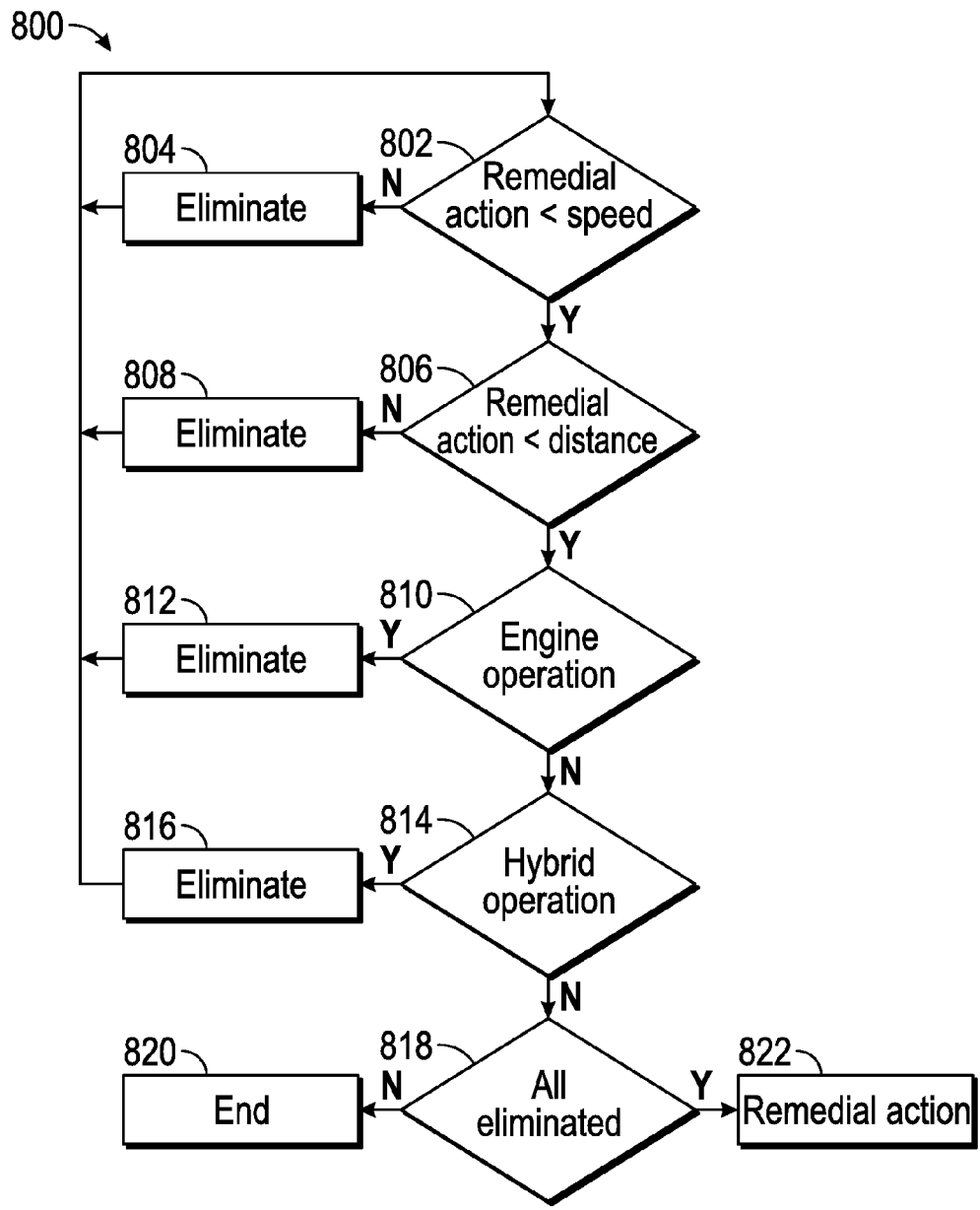
FIG. 9 is a flowchart of a method for arbitrating the possible remedial actions after the hybrid vehicle has experienced the loss of propulsion.

FIG. 9 is a flowchart of a method 800 for arbitrating among the possible remedial actions in order to select a remedial action command that is most suitable for the operating conditions of the hybrid vehicle 10 (i.e., the selected remedial action command). As discussed above with respect to step 310 of the method 300 (FIG. 4), the command center 120 selects the most suitable remedial action command based, at least in part, on the torque capability and discharge power limit determined using the method 700, the vehicle operating parameters, the diagnostic data, the speed constraint determined using the method 500, and the distance constraint determined using the method 600. To do so, the command center 120 can execute the method 800.

The method 800 begins with step 802, which entails determining whether the possible remedial actions determined using the method 300 can be performed under the speed constraint determined using the method 500. To do so, the command center 120 compares the speeds required to execute each of the possible remedial actions with the allowable speed range previously determined using the method 300. If the possible remedial action cannot be executed under the speed constraints determined using the method 500, then the method 800 continues to step 804. In step 804, the command center 120 eliminates the currently assessed remedial action as a suitable remedial action, selects another possible remedial action, and the method 800 then returns to step 802. If the possible remedial action can be performed under the speed constraints determined using the method 500, then the method 800 proceeds to step 806.

Step 806 entails determining whether the possible remedial action can be performed under the distance constraint previously determined using the method 600. In this embodiment, the distance constraint refers to the distance that can be traveled by the hybrid vehicle 10 in the charge-depletion mode. However, it is contemplated that the distance constraint may alternatively refer to the distance that the hybrid vehicle 10 can travel in the charge-sustaining mode, blended mode, and/ or the charge-depletion mode. In step 806, the command center 120 compares with the distance from the current location of the hybrid vehicle 10 to the desired destination with the distance constraints previously determined using the method 600. If the possible remedial action cannot be executed under the distance constraints determined using the method 600, then the method 800 continues to step 808. In step 808, the command center 120 eliminates the currently assessed remedial action as a suitable remedial action, selects another possible remedial action, and the method 800 then returns to step 802. If the possible remedial action can be performed under the distance constraints determined using the method 600, then the method 800 proceeds to step 810.

Step 810 entails determining whether the possible remedial action requires an engine operation that has been disabled. In step 810, the command center 120 compares the disabled engine operations with the engine operations required to execute the possible remedial action. If the possible remedial action requires the use of a disabled engine operation, then the method 800 continues to step 812. In step 812, the command center 120 eliminates the currently assessed remedial action as a suitable remedial action, selects another possible remedial action, and the method 800 then returns to step 802. If the possible remedial action does not require the use of a disabled engine operation, then the method 800 proceeds to step 814.

Step 814 entails determining whether the possible remedial action requires a hybrid powertrain operation that has been disabled. In step 814, the command center 120 compares the disabled hybrid powertrain operations with the hybrid powertrain operations required to execute the possible remedial action. If the possible remedial action requires the use of a disabled hybrid powertrain operation, then the method 800 continues to step 816. In step 816, the command center 120 eliminates the currently assessed remedial action as a suitable remedial action, selects another possible remedial action, and the method 800 then returns to step 802. If the possible remedial action does not require the use of a disabled hybrid powertrain operation, then the method 800 proceeds to step 818.

Step 818 entails determining whether there are possible remedial actions that have not been eliminated as a suitable remedial action. If all the possible remedial actions have been eliminated, then the method 800 proceeds to step 820. In step 820, the command center 120 ends the method 800 and no remedial action is performed. If not all the possible remedial actions have been eliminated, then the method 800 continues to step 822.

In step 822, the command center 120 selects a suitable remedial action among the possible remedial actions that have not been eliminated. The "suitable remedial action" may be, for example, the remedial action that allows the hybrid vehicle 10 to drive from the current location to a geographical location that is the closest possible location to the desired destination in the most efficient manner. Then, the command center 120 commands the hybrid powertrain 29, via the control module 26, to perform the suitable remedial action. The suitable remedial action is also referred to as the selected remedial action. In addition, the command center 120 sends data indicative of the speed constraints and the distance constraints to the control module 26 of the hybrid powertrain 29. Step 822 is part of the step 212 of the method 200.

Figure 10:
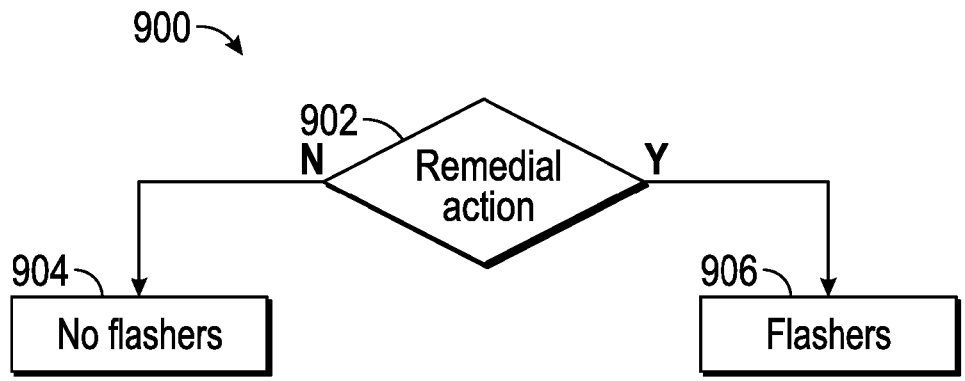
FIG. 10 is a flowchart of a method for determining whether to activate the emergency flashers of the hybrid vehicle.

FIG. 10 is a method for determining whether to activate the emergency flashers of the hybrid vehicle 10 after the hybrid vehicle 10 has experienced a loss in propulsion. The emergency flashers are also known as hazard lights. As discussed above, the step 212 of the method 200 entails commanding the hybrid powertrain 29 perform the remedial action that corresponds to the remedial action command received from the command center 120. As part of step 212, the command center 102 and/or the control module 26 can also command the emergency flashers to activate if a remedial action command was sent to the control module 26. To do so, the command center 120 and/or the control module 26 can execute the method 900.

The method 900 begins with step 902, which entails determining whether there is any remedial action presently being commanded. In other words, the command center 120 and/or the control module 26 can determine whether a remedial action command is currently being (or is about to be) executed. If no remedial action is being (or is about to be) executed, then the method 900 proceeds to step 904. In step 904, the control module 26 commands the emergency flashers to remain deactivated. If a remedial action is being (or is about to be) executed, then the method 900 continues to step 906. In step 906, the command center 120 commands (via the control module 26) the emergency flashers to activate.

Figure 11:
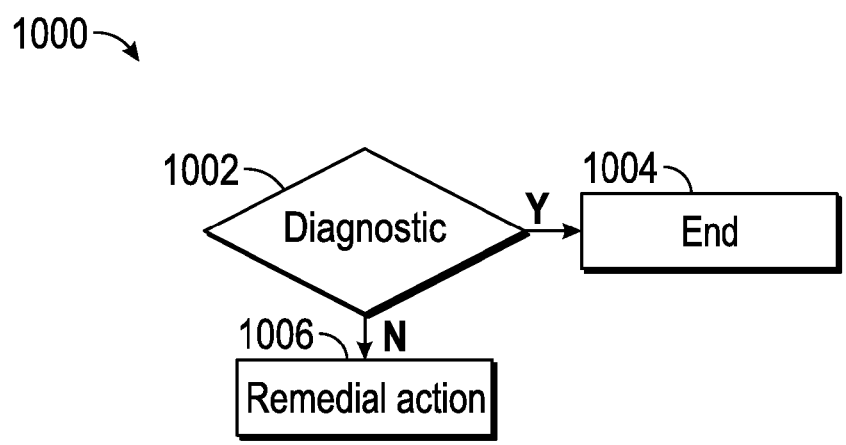
FIG. 11 is a flowchart of a method for operating the hybrid vehicle after it has received the remedial action command from a command center.

FIG. 11 is a flowchart of a method 1000 for operating the hybrid vehicle 10 after it receives the remedial action command from the command center 120. Once the control module 26 receives the remedial action command from the command center 120, the control module 26 executes the method 1000. The method 1000 begins with step 1002, which entails determining whether there is any existing diagnostic data indicating that the hybrid vehicle 10 would be prevented from implementing the commanded remedial action. If there is diagnostic data indicating the hybrid vehicle 10 would be precluded from executing the commanded remedial action, then the method 1000 continues to step 1004. In step 1004, the control module 26 terminates the method 1000. If there is no diagnostic data indicating the hybrid vehicle 10 would be precluded from executing the commanded remedial action, then the method 1000 continues to step 1006. In step 1006, the control module 26 commands the hybrid powertrain 29 to execute the commanded remedial action until the hybrid vehicle 10 reaches the predetermined location (e.g., the desired destination or an alternative destination) or until a vehicle shutdown command is received.

While the best modes for carrying out the teachings have been described in detail, those familiar with the art to which this disclosure relates will recognize various alternative designs and embodiments for practicing the teachings within the scope of the appended claims.

The invention claimed is:

1. A method for controlling a hybrid vehicle, the hybrid vehicle including an internal combustion engine, an electric machine, and an energy storage device electrically connected to the electric machine, wherein the method comprises:
   sending data, via a control module, indicative of a current location of the hybrid vehicle to a command center after the hybrid vehicle has experienced a loss of propulsion;
   sending data, via the control module, indicative of a desired destination to the command center;
   receiving, via the control module, a remedial action command from the command center, wherein the remedial action command is based, at least in part, on vehicle operating parameters, the current location of the hybrid vehicle, and the desired destination, wherein the vehicle operating parameters include a current state of charge (SOC) of the energy storage device;
   receiving, via the control module, a distance constraint of the hybrid vehicle from the command center, wherein the distance constraint is a range of a distance the hybrid vehicle is capable of traveling from the current location, and the distance constraint is based, at least in part, on the current SOC of the energy storage device;
   receiving, via the control module, a speed constraint of the hybrid vehicle, wherein the speed constraint is based, at least in part, on the current SOC of the energy storage device;
   receiving, via the control module, an alternative destination from the command center if the hybrid vehicle is incapable of traveling from the current location to the desired destination;
   receiving a torque capability of the hybrid vehicle from the command center;
   determining whether the torque capability allows the hybrid vehicle to drive under the speed constraint and the distance constraint; and
   commanding, via the control module, the hybrid vehicle to perform a remedial action corresponding to the remedial action command, wherein the remedial action allows the hybrid vehicle to be driven from the current location to a predetermined location after the hybrid vehicle has experienced the loss of propulsion.

2. The method of claim 1, further comprising determining possible remedial actions based, at least in part, on the vehicle operating parameters.

3. The method of claim 2, further arbitrating among the possible remedial actions in order to determine the remedial action command, wherein the remedial action command is based, at least in part, on the possible remedial actions, the speed constraint, and the distance constraint.

4. The method of claim 3, wherein the hybrid vehicle includes emergency flashers, and the method further includes activating the emergency flashers when the hybrid vehicle receives the remedial action command from the command center.

5. The method of claim 4, wherein the hybrid vehicle includes a control module in communication with the electric machine and the internal combustion engine, and the method further includes determining whether there is any existing diagnostic data indicating that the hybrid vehicle would be prevented from implementing the commanded remedial action.

6. A hybrid vehicle, comprising:
   an internal combustion engine configured to combust fuel; and
   an electric machine configured to convert electrical energy into mechanical energy; and
   a control module in communication with the internal combustion engine and the electric machine, wherein the control module is programmed to:
      send data indicative of a current location of the hybrid vehicle to a command center after the hybrid vehicle has experienced a loss of propulsion;
      send data indicative of a desired destination to the command center;
      receive a remedial action command from the command center, wherein the remedial action command is based, at least in part, on vehicle operating parameters, the current location of the hybrid vehicle, and the desired destination;
      receive a distance constraint of the hybrid vehicle from the command center;
      receive a speed constraint of the hybrid vehicle from the command center;
      receive a torque capability of the hybrid vehicle from the command center;
      determine whether the torque capability allows the hybrid vehicle to drive under the speed constraint and the distance constraint; and
      command the hybrid vehicle to perform a remedial action corresponding to the remedial action command, wherein the remedial action allows the hybrid vehicle to travel from the current location to a predetermined location after the hybrid vehicle has experienced the loss of propulsion.

7. The hybrid vehicle claim 6, further comprising an energy storage device electrically connected to the electric machine, wherein the vehicle operating parameters includes a current state of charge (SOC) of the energy storage device.

8. The hybrid vehicle of claim 7, wherein the distance constraint is a range of a distance the hybrid vehicle is capable of traveling from the current location.

9. The hybrid vehicle of claim 8, wherein the distance constraint is based, at least in part, on the current SOC of the energy storage device.

10. The hybrid vehicle of claim 9, wherein the control module is programmed to communicate an alternative destination if the hybrid vehicle is incapable of traveling from the current location to the desired destination.

11. The hybrid vehicle of claim 10, wherein the speed constraint is based, at least in part, on the current SOC of the energy storage device.

12. The hybrid vehicle of claim 11, wherein the control module is programmed to determine whether there is any existing diagnostic data indicating that the hybrid vehicle would be prevented from implementing the commanded remedial action.

13. The hybrid vehicle of claim 6, wherein the predetermined location is the desired destination.

* * * * *